(12) United States Patent
Kikuchi et al.

(10) Patent No.: US 6,376,821 B1
(45) Date of Patent: Apr. 23, 2002

(54) IMAGE READING APPARATUS

(75) Inventors: Michio Kikuchi; Yoshiya Imoto, both of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/292,942

(22) Filed: Apr. 16, 1999

(30) Foreign Application Priority Data

Apr. 21, 1998 (JP) .......................... 10-110819

(51) Int. Cl.[7] .............. G01B 9/04; H04N 1/46
(52) U.S. Cl. .................. 250/208.1; 358/515
(58) Field of Search ............. 250/208.1; 358/409, 358/505, 513–515, 474, 482, 483, 493, 494; 257/291, 440; 348/337, 340, 344

(56) References Cited

U.S. PATENT DOCUMENTS 5,570,204 A * 10/1996 Kumashiro .............. 250/208.1
5,696,610 A * 12/1997 Imoto .......................... 358/505
5,844,233 A * 12/1998 Sato .......................... 250/208.1

FOREIGN PATENT DOCUMENTS

| JP | 6-261236 | 9/1994 |
| JP | 7-46610 | 2/1995 |
| JP | 9-205523 | 8/1997 |

* cited by examiner

Primary Examiner—F L Evans
Assistant Examiner—Zandra V. Smith
(74) Attorney, Agent, or Firm—Oliff & Berridge, PLC

(57) ABSTRACT

After light transmitted through platen glass is incident on a lens and focused, the light is transmitted through a parallel flat plate and imaged in a CCD image sensor. The resolving power of the CCD image sensor is 600 dpi in this case and one pixel is 8 $\mu$m. A parallel flat plate is provided with a function for displacing all rays incident on the plate in parallel. The quantity of parallel displacement differs depending upon each wavelength. Therefore, lateral chromatic aberration can be reduced to the extent that it is ignorable (approximately $\frac{1}{10}$ of pixel size) by making reflected light outgoing from the lens and having lateral chromatic aberration incident on the parallel flat plate.

15 Claims, 10 Drawing Sheets

B -------
G ·······
R —··—

IMAGE READING APPARATUS

BACKGROUND OF THE INVENTION

The present invention relates to an image reading apparatus for reading a color manuscript (original) particularly.

For a manuscript reading apparatus such as a scanner, high resolving power, a high quality of image and others are demanded and for a manuscript reading apparatus such as a copying machine, high speed, correspondence to large width (A3 size) and the lifting of a manuscript in the binding margin of a book is demanded in addition to the above. Describing them in physical and optical terms, a high Nyquist frequency, a high modulation transfer function (MTF), the high sensitivity of a sensor, a large angle of view and the large depth of a focus are demanded. Of them, it is MTF and the depth of a focus that are related to the specifications of an imaging optical system after a sensor and conjugate length are determined.

Further, in the case of a color copying machine, in addition to the above conditions, there is also a problem related to the chromatic aberration of a lens. The chromatic aberration is classified into axial chromatic aberration equivalent to displacement in the direction of an optical axis and lateral chromatic aberration equivalent to displacement in the longitudinal direction of a charge-coupled (CCD) line sensor and have a different bad effect in the evaluation of an imaging optical system. Concretely, axial chromatic aberration displaces the peak of MTF of each color in an imaging optical system in a defocused direction, MTF is deteriorated as a result because balance is required to be kept and the quality of an image is deteriorated. In the meantime, as lateral chromatic aberration displaces the imaging position of each color in the longitudinal direction of a CCD sensor, chromatic displacement shown in FIG. 12B is caused through each color is to be overlapped as shown in FIG. 12A.

As for MTF characteristics, as aberration in monochrome except chromatic aberration also deteriorates MTF, its mechanism is very complicated. For evaluation items related to MTF, there are the height of MTF at a level of a CCD sensor, tolerance (the depth of a focus) in case a manuscript is lifted and color balance ($\Delta$MTF) in each angle of view.

Of the MTF evaluation items, the increase of $\Delta$MTF and the increase of lateral chromatic aberration are different in a physical (optical) behavior, however, from the viewpoint of output from a CCD sensor, they produce similar effect. That is, as shown in FIG. 12C, there occurs a phenomenon that signal values (levels) of three colors to be output from a pixel in the same position in the longitudinal direction vary and as a result, chromatic information acquired by synthesizing them also varies from an original value. The variation of chromatic information means that the color reproducibility based upon a manuscript of an output image is deteriorated in the case of a color copying machine. In the case of a color copying machine, processing for converting the read information of BGR to yellow (Y), magenta (M), cyan (C) and black (K) which are respectively the color of toner is required, however, if the read chromatic information of original data includes displacement in unspecified quantity, correction is very difficult.

There is also a problem intrinsic to lateral chromatic aberration. It is pigmentation at an edge in the same chromatic area. If an image the contours of which are often obscure such as a photograph is copied and output, slight displacement of colors is often not an eyesore. However, if only an edge of a character and a graphic form in a vertical scanning direction has different color due to lateral chromatic aberration in a manuscript composed of a combination of characters and graphic forms such as a business document, it is very conspicuous and makes a bad impression on a user. In the meantime, in the case of $\Delta$MTF, color is different as a whole, however, it is never caused that only an edge has different color. At this point, lateral chromatic aberration has a worse effect upon the quality of an image than $\Delta$MTF.

Further, in a digital color copying machine, generally, different image processing is applied depending upon whether a manuscript is a text or an image such as a photograph. That is, if contrast between a text and a background is clear in case a manuscript is a text, visibility is satisfactory. Therefore, processing such as an edge part in a text is highlighted is executed. In the meantime, a case of an image manuscript is contrastive and if the gradation of color is smooth, visibility is satisfactory. As described above, the image processing section of a copying machine is often provided with a picture/character separating processing function to differentiate processing depending upon the type of a manuscript.

Also, in a digital color copying machine, if read color is black, a black judgment function is also provided in addition to the above picture/character separating processing function because more beautiful output can be acquired in a case that printout is acquired using black toner than in a case that black is acquired by overlapping Y, M and C. Therefore, if output from CCD is off from black due to the above aberration particularly in case a black character is separated from image information, an error of picture/character separating processing and an error of black judgment are simultaneously caused, a black character in a manuscript is colored and output in an obscure state and reducibility is very deteriorated. Particularly, recently, because of the development and popularization of a personal computer and a presentation document preparation tool, a full color manuscript including high definition character information overflows and the frequency of copying them is also increased. Therefore, the above problem becomes important.

Heretofore, as measures for these problems, generally, the balance of characteristics has been kept by determining parameters of a lens in the design of the lens so that aberration is as small as possible in addition to image processing. However, in the design of a lens, the characteristics of MTF have a tendency to be deteriorated when the correction of lateral chromatic aberration is tried. Then, anomalous dispersion glass effective as a countermeasure of chromatic aberration is considered to be used, however, there is a limit in improvement by improving the characteristics of only a lens. Anomalus dispersion glass requires three to five times as high costs as normal glass material.

In the design of a lens, a method of reducing an aperture or an angle of view is adopted to decrease aberration, however, an angle of view cannot be greatly varied because of constraints of manuscript size and space in a copying machine. Then, a method of reducing an aperture (darkening a lens) to decrease aberration is adopted, however, because of the signal-to-noise ratio (S/N) of a sensor, if a lens is darkened maintaining high speed and high resolving power, the luminous energy of a lamp is required to be increased to secure required luminous energy and power consumption is increased.

Normally, power acquired from the outlet of an office is 1.5 kVA, however, in the case of an electrophotographic copying machine, heat is utilized for fixing toner and a heater for generating heat requires very large power. Currently, a color electrophotographic copying machine requires power close to 1.5 kVA to read a manuscript at 400 dpi. Therefore, the reduction of power consumed to read a manuscript is desired. Further, as the area of a sensor pixel becomes smaller when resolving power is enhanced up to 600 dpi maintaining copying speed, the relative quantity of light received by a sensor becomes a half or less. As the quantity of data is increased, a video rate is also increased and as a result, as power is also increased, it is currently impossible to darken a lens in addition and increase the power of a lamp. Rather, to compensate the received quantity of light made a half or less, a lens is required to be lightened.

There are many reasons for designing so that it is as light as possible in addition. Recently, a monochrome copying machine uses a xenon lamp the power consumption of which is small in place of a halogen lamp which has been adopted for a lamp. Naturally, as a full color copying machine will also use a xenon lamp to save energy, design in consideration of a xenon lamp is required. However, the quantity of light which a xenon lamp can emit is limited and when the process speed of a copying machine, S/N of a CCD sensor and resolving power are determined, the brightness of a lens is also necessarily led based upon them.

Also, for a countermeasure for lateral chromatic aberration, technique to correct output from a CCD sensor electrically is also well-known, however, in that case, MTF as an electric signal is deteriorated and it has a bad effect upon the reproducibility of a character. As a result, though resolving power is enhanced, the quality of an image is not enhanced and even if resolving power is enhanced from 400 dpi to 600 dpi in specifications described in a catalog and the quality of an image seems higher, actually, a situation that the quality of an image is not enhanced may occur.

For example, in the Unexamined Japanese Patent Application Publication No. Hei 7-46610, technique for storing information related lateral chromatic aberration and skew aberration in an optical system such as a lens in a memory and correcting the lateral chromatic aberration or/and the skew aberration of an image imaged on an image sensing device such as CCD based upon the above information is disclosed. In the Unexamined Japanese Patent-Application Publication No. Hei 9-205523, technique for reducing lateral chromatic aberration by arranging a reflector provided with a first reflecting surface which reflects only light having a specific wavelength and a second reflecting surface curved in the longitudinal direction for reflecting light having a predetermined wavelength and transmitted through the first reflecting surface between a manuscript and an imaging lens is disclosed. Further, in the Unexamined Japanese-Patent Application Publication No. Hei 6-261236, technique for extracting a picture signal in a dead zone existing between pixels of an image sensing device and enhancing resolving power by arranging a glass plate between an imaging lens and the image sensing device such as CCD, periodically varying the angle with an optical path of the glass plate, extracting a picture signal when ½ pixel is off and a picture signal when ½ pixel is not off from the image sensing device according to time series and processing these two picture signals is disclosed.

The above problems can be improved up to a level at which a user does not perceive if various parameters for the reproducibility of color, particularly pigmentation at an edge of a character and others can be determined well in a range to some extent of the cost. However, specifications for imaging performance when picture/character separating processing and the judgment of a black character are to be executed satisfactorily are very severe such as the displacement of colors caused by lateral chromatic aberration should be within approximately 1 $\mu$m and higher characteristic is also required for $\Delta$MTF. To realize these specifications by only a lens and well-known technology in the range of the realistic cost as a mass-produced product in the above prior art, the design reaches a limit and there is a problem that it is very difficult to realize the specifications.

SUMMARY OF THE INVENTION

The present invention is made in view of the above situations and the object is to provide an image reading apparatus wherein the imaging performance of an optical system can be enhanced at a low cost and picture/character separating processing and the judgment of a black character can be satisfactorily executed.

To solve the above problems, an invention disclosed in Aspect 1 is characterized in that irradiation means for irradiating a manuscript, imaging means for imaging reflected light from the manuscript irradiated by the above irradiation means, photoelectric conversion means for converting the reflected light imaged by the above imaging means to electric information and parallel displacement means inserted into an optical path between the above manuscript and the above photoelectric conversion means for displacing rays of the above reflected light by quantity different depending upon each wavelength in parallel so as to reduce difference in the maximum magnification between wavelengths of the above reflected rays so that the difference is smaller than at least the pixel of the photoelectric conversion means are provided.

According to the above invention, after difference in the maximum magnification between wavelengths of rays of reflected light is reduced so that the difference is smaller than at least the pixel of the above photoelectric conversion means by displacing the above reflected rays imaged by the imaging means in parallel by quantity different depending upon each wavelength by parallel displacement means, the rays are made incident on the photoelectric conversion means. Therefore, lateral chromatic aberration can be reduced to the extent that it is ignorable. As a result, the imaging performance of an optical system can be enhanced at a low cost, and picture/character separating processing and the judgment of a black character can be satisfactorily executed.

Besides, according to another aspect of the present invention, there is an image reading method comprising the steps of: irradiating a manuscript; imaging reflected light from the irradiated manuscript; converting reflected light imaged to electric information; and displacing rays of the reflected light by quantity different depending upon each wavelength in parallel so as to reduced difference in the maximum magnification between wavelengths of the reflected rays so that the difference is smaller than at least a pixel in the photoelectric converting step.

DETAILED DESCRIPTION OF THE PREFERRED EMBODIMENTS

Figure 1:
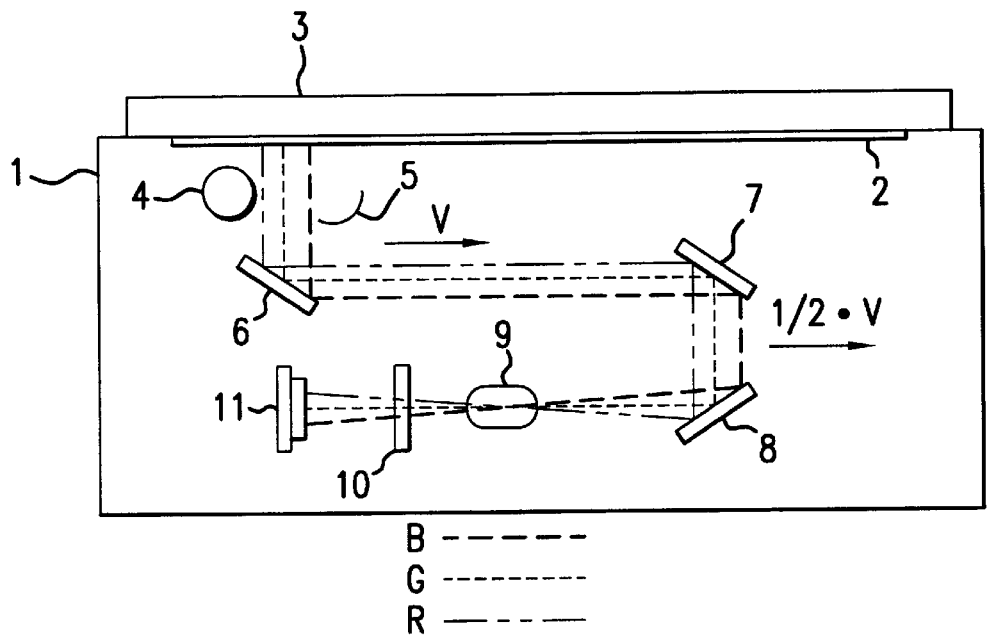
FIG. 1 is a schematic drawing showing the configuration of a manuscript reading apparatus equivalent to a first embodiment of the present invention.

Next, referring to the drawings, embodiments of the present invention will be described.

First Embodiment

FIG. 1 is a schematic drawing showing the configuration of a manuscript reading apparatus equivalent to a first embodiment of the present invention. As shown in FIG. 1, platen glass 2 for loading a manuscript on it is attached to the upper opening of a cabinet 1. A manuscript is set on the platen glass 2 with an image to be read directed downward. A platen cover 3 is attached to the upper part of the cabinet 1 so that the platen cover can be lifted. The platen cover 3 covers the platen glass 2 when an image of a manuscript is read and functions so that the manuscript is touched to the platen glass 2.

A lamp 4 for radiating light on a manuscript set on the platen glass 2, a reflector 5 for efficiently focusing light emitted from the lamp 4 on the surface of the manuscript, a first mirror 6 for reflecting reflected light from the manuscript sideward, a second mirror 7 for reflecting reflected light from the first mirror 6 downward and a third mirror 8 for reflecting reflected light from the second mirror 7 sideward are also provided inside the cabinet 1.

Of them, the lamp 4, the reflector 5 and the first mirror 6 are mounted on a full-rate carriage not shown and the carriage is moved at the speed of v in a direction shown by an arrow in FIG. 1 (in a horizontal scanning direction). The second mirror 7 and the third mirror 8 are mounted on a half-rate carriage not shown and the carriage is moved at the speed of ½ v in a direction shown by another arrow in FIG. 1 to keep optical path length fixed. Further, inside the cabinet 1, a lens 9 for imaging reflected light from a manuscript, a parallel flat plate 10 for correcting chromatic aberration and a line sensor 11 for converting imaged light to electric information such as a CCD image sensor are provided.

Figure 2:
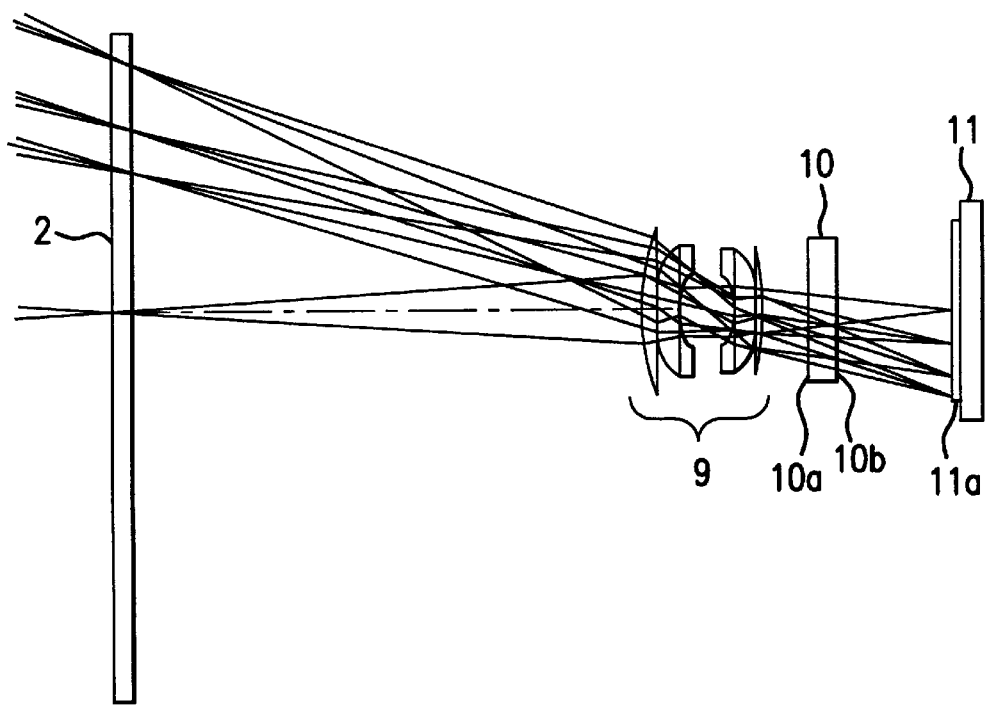
FIG. 2 is a schematic drawing showing the configuration of an optical system from which only parts having an effect upon chromatic aberration and MTF characteristic are extracted.

Next, FIG. 2 is a schematic drawing of the configuration of an optical system showing only parts which have an effect upon chromatic aberration and MTF characteristics. The same reference number is allocated to a part corresponding to the same part in FIG. 1 and the description is omitted. However, a part such as a mirror on which only tolerance and reflectance have an effect is omitted. Light transmitted through the platen glass 2 is incident on the lens 9, is focused, afterward, after the light is transmitted through the parallel flat plate 10, it is imaged in the CCD image sensor 11. At this time, cover glass 11a covers the pixel of the CCD image sensor 11 and this also has an effect upon imaging performance. One pixel of the CCD image sensor 11 for 600 dpi is 8 μm. A double Gaussian type is adopted for the lens 9, however, the present invention is not limited to these.

Figure 3A:
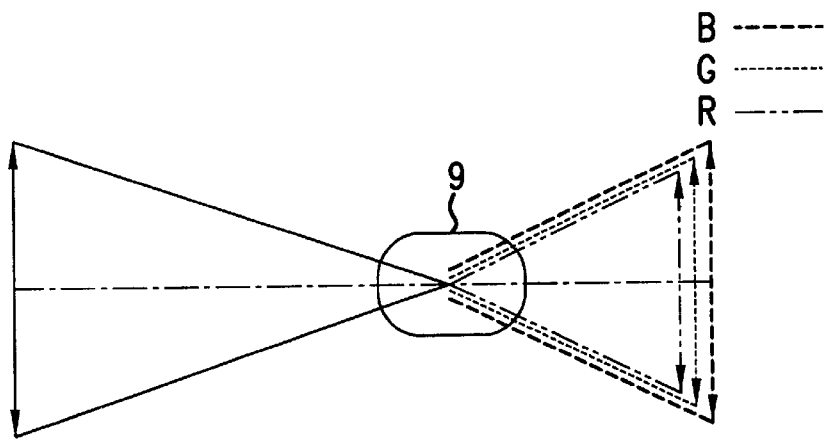
FIGS. 3A to 3C are conceptual drawings showing the effect of correcting lateral chromatic aberration by a parallel flat plate.
Figure 3B:
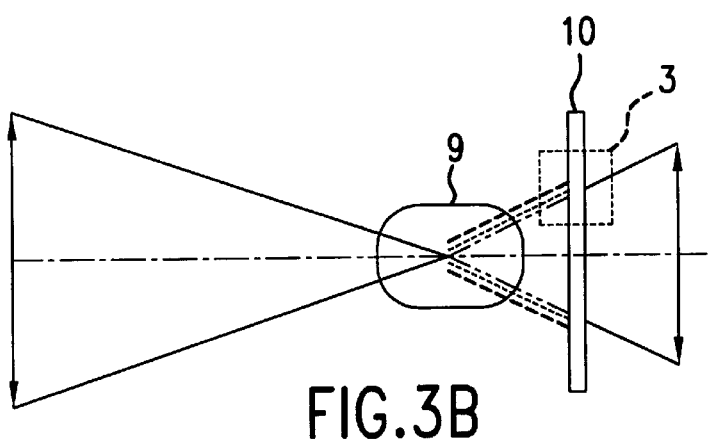
Figure 3C:
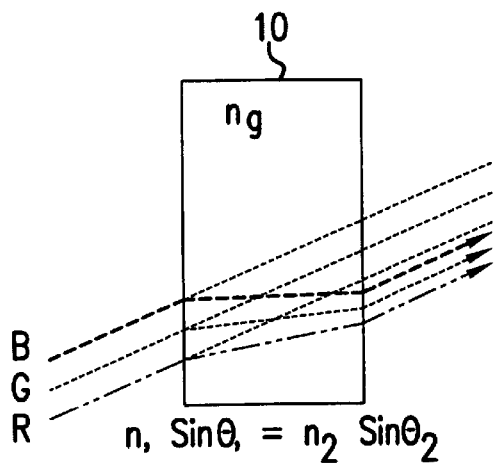

The parallel flat plate 10 is a transparent plate the both surfaces of which are parallel:, which is fixed in an optical path and which is provided with predetermined thickness, and is very effective in correcting lateral chromatic aberration. FIGS. 3A to 3C show a conceptual drawing showing the effect. If the parallel flat plate 10 is not included in the optical system, lateral chromatic aberration occurs in each color (blue: B, green: G, red: R) of reflected light outgoing from the lens 9 as shown in FIG. 3A. In the meantime, as shown in FIG. 3B, the lateral chromatic aberration of rays outgoing from the parallel flat plate 10 can be reduced so that it is ignorable (approximately 1/10 of pixel size) as shown in an enlarged view of FIG. 3C by including the parallel flat plate 10 in the optical system and making the rays which meet a predetermined condition incident on the parallel flat plate 10. Concretely, if difference in the maximum magnification is 20% or less, an error in separating character/graphic form information and image information can be reduced up to zero theoretically. This reason is that as shown in FIG. 3C, the parallel flat plate 10 is provided with a characteristic of displacing all incident rays in parallel and that further, quantity in which the rays are displaced in parallel is different depending upon each wavelength (B, G, R). Concretely, the displaced quantity of rays with a short wavelength is large. Therefore, as for reflected light outgoing from the lens 9, rays with a short wavelength are required to be regulated so that they are outside in a vertical scanning direction, that is, they are blue (B), green (G) and red (R) in order from the outside.

The above characteristic of reducing lateral chromatic aberration is not realized by only the parallel flat plate 10 and the characteristics of the lens provided at the former stage are also required to be considered. Therefore, the effectiveness of the parallel flat plate is shown by designing so that the parameters of the parallel flat plate 10 and the parameters of the lens 9 are combined to reduce the lateral chromatic aberration of rays outgoing from the parallel flat plate 10 to the extent that it is ignorable and compensate each other.

As described above, the precise correction of chromatic aberration is not required by providing a function for correcting chromatic aberration to the parallel flat plate 10 and combining a convex lens the dispersive power of which is low and a concave lens the dispersive power of which is high as the lens 9, as a result, the curvature and others of each lens composing the lens 9 are reduced and design which can afford tolerance large clearance is enabled.

Figure 4:
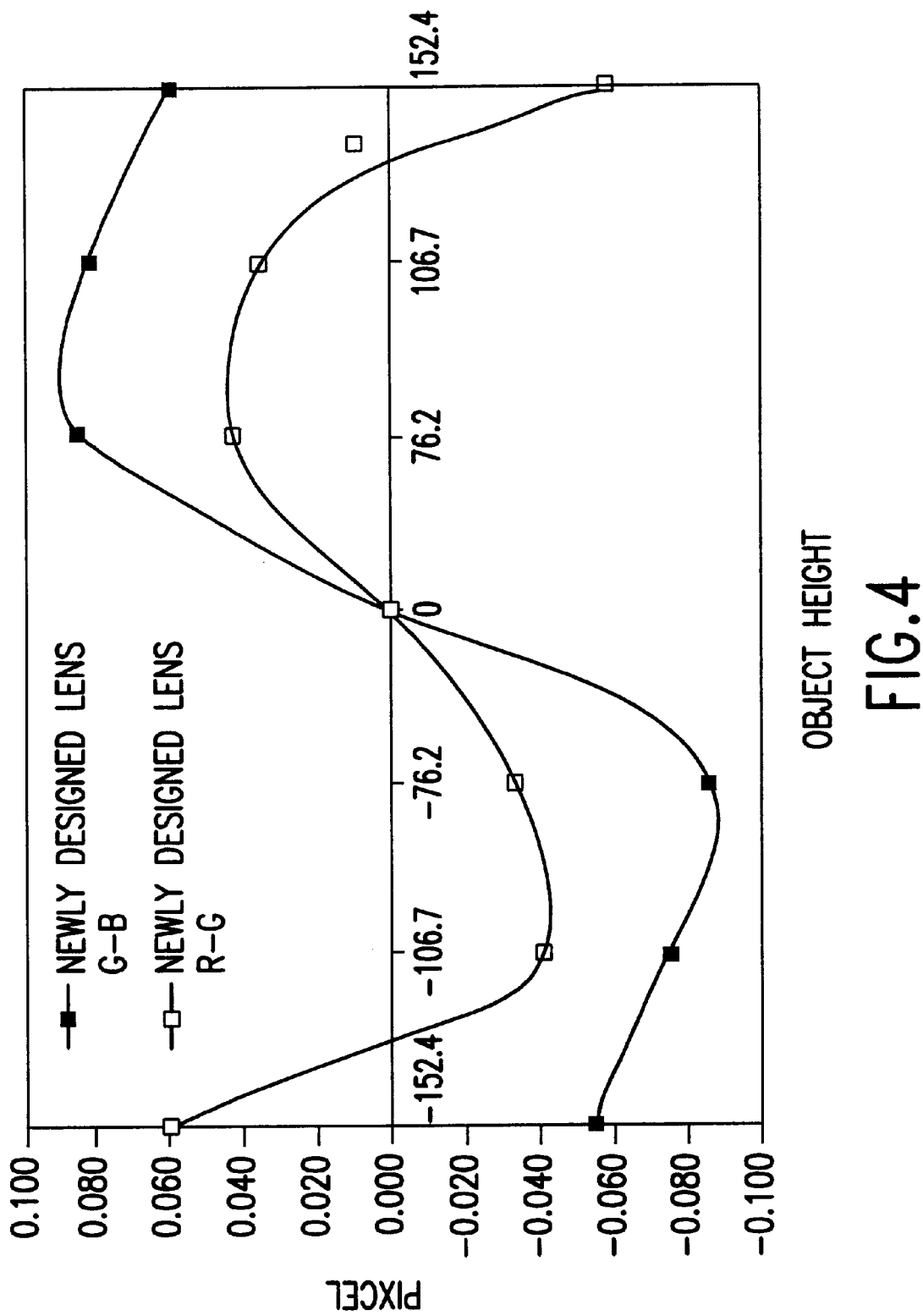
FIG. 4 is a conceptual drawing showing the characteristic based upon an angle of view of lateral chromatic aberration in an optical system in which a lens and the parallel flat plate are combined.

FIG. 4 is a conceptual drawing showing the characteristic related to an angle of view of lateral chromatic aberration in the optical system designed this time and produced as a prototype in which the lens 9 and the parallel flat plate 10 are combined. In FIG. 4, the characteristic in case a manuscript in A3 size is used is shown, the x-axis shows an angle of view (the height of an object) and the y-axis shows chromatic aberration (pixel). From FIG. 4, it is clear that lateral chromatic aberration is within 0.1 pixel (that is, within 0.8 μm) for all angles of view corresponding to the manuscript in A3 size. Normally, lateral chromatic aberration has a tendency to be increased at an angle of view at the end, however, as the parallel flat plate 10 is provided with a characteristic that the quantity of parallel displacement is monotonously increased for an angle of view, the larger an angle of incidence with the parallel flat plate 10 is, the more the quantity of parallel displacement is increased. Therefore, the above tendency can be negated. To acquire the above effect, it is desirable that the thickness of the parallel flat plate 10 is at least 5 mm or more.

In the first embodiment, the independent parallel flat plate 10 is inserted between the lens 9 and the CCD image sensor 11, however, in the optical system shown in FIG. 2, the platen glass 2, the cover glass 11a, an optical filter not shown in FIG. 2 and others exist as a substitutable component, that is, a component provided with the similar function to the parallel flat plate 10. Naturally, these can be used together with the parallel flat plate 10 for correcting lateral chromatic aberration.

As the platen glass 2 covers a manuscript in A3 size, it has very large area. Therefore, to realize design that the characteristic with which the parallel flat plate 10 is provided is added to the platen glass 2, glass material the cost of which is high to some extent, compared with normal platen glass 2 is required to be used and a problem that the cost is increased occurs. If conventional type plate glass shows parameters similar to those of the parallel flat plate 10 when the plate glass is combined with the lens 9, a merit that the platen glass can be used in place of the parallel flat plate is made. However, generally, a parallel flat plate located at the former stage of the lens 9 normally deteriorates chromatic aberration. Therefore, it is difficult to realize design that the platen glass 2 is used in place of the parallel flat plate.

If a general-purpose sensor is used for the CCD image sensor 11, the parameters of the cover glass 11a of the CCD image sensor 11 are also determined. The thickness of the cover glass 11a is normally approximately 1 mm and it is difficult for the cover glass to have parameters to the extent that lateral chromatic aberration can be satisfactorily corrected. The optical filter not shown is also similar. However, as for the optical filter, both functions can be made compatible by applying coating or the dispersion of pigment to the parallel flat plate 10 for correcting lateral chromatic aberration.

Nonreflective coating is applied to the front surface 10a (the surface on/from which reflected light is incident/outgoing) of the above parallel flat plate 10, mirror processing is applied to the back surface 10b (the reflecting surface) and the parallel flat plate 10 may be also arranged at an angle of 45° with an optical axis. Naturally, the CCD image sensor 11 is also arranged in the direction of the optical axis of reflected light from the parallel flat plate 10. As a result, an optical path in the parallel flat plate 10 is doubled and the thickness of the parallel flat plate 10 can be reduced up to ½.

When lateral chromatic aberration is suppressed as described above, MTF characteristic is often not improved by conventional type design based upon only a lens. Then, in the first embodiment, to also simultaneously improve MTF characteristic, the level of MTF characteristic is enhanced by securing the luminous energy of a halogen lamp and setting an F value to 4.5.

Second Embodiment

Figure 5:
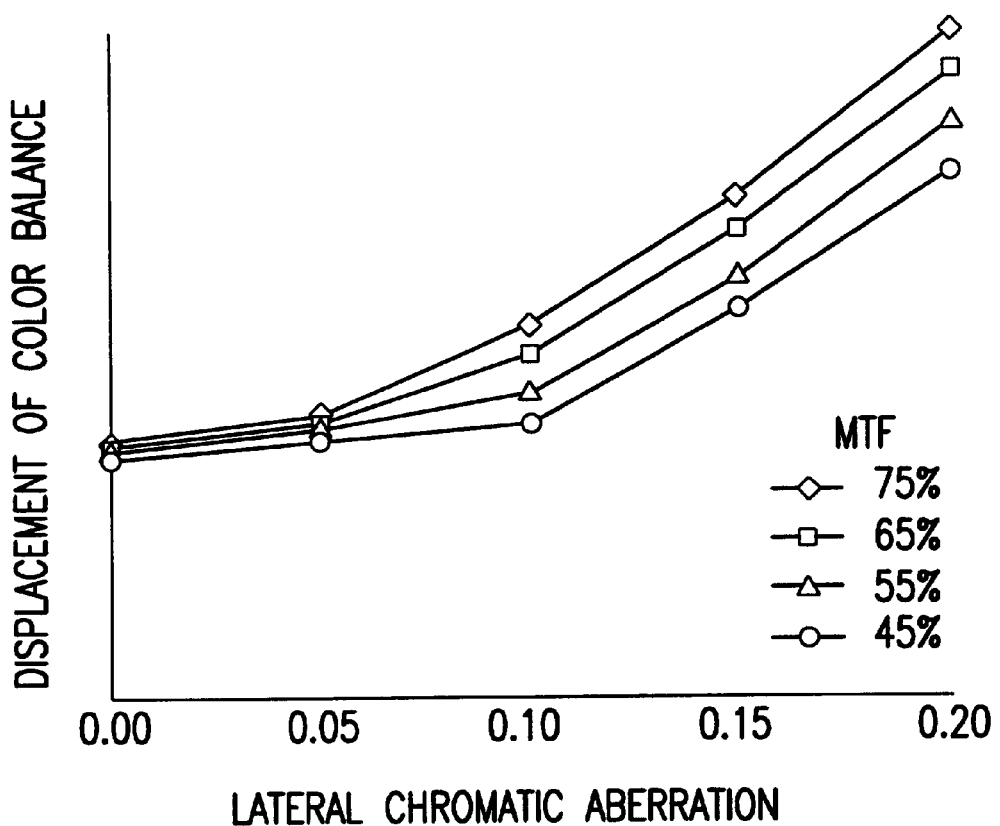
FIG. 5 is a conceptual drawing showing an effect which lateral chromatic aberration has upon color balance every MTF.

Next, a second embodiment of the present invention will be described. As the configuration of an image reading apparatus equivalent to the second embodiment is the same as that shown in FIG. 1, the description is omitted. An effect which balance between MTF and lateral chromatic aberration has upon the quality of an image will be considered below. FIG. 5 is a conceptual drawing showing an effect which lateral chromatic aberration has upon color balance every MTF. FIG. 5 shows that when MTF is high in case lateral chromatic aberration is large, the displacement of color balance is large.

Figure 6A:
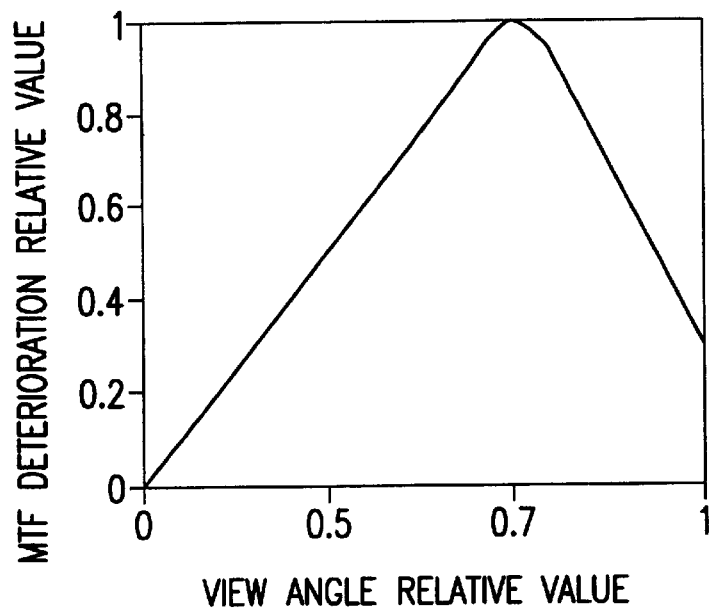
FIGS. 6A and 6B are conceptual drawings showing the characteristic based upon an angle of view of MTF and the characteristic based upon an angle of view of lateral chromatic aberration.
Figure 6B:
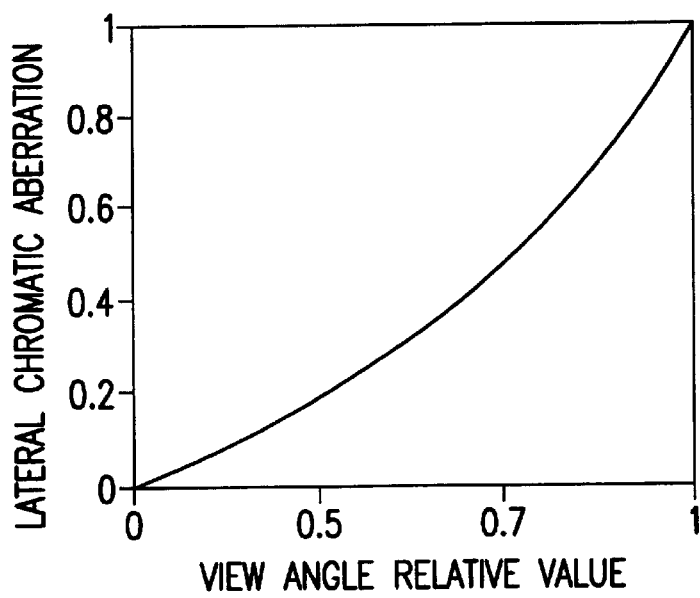

In the meantime, in the case of design such as the quality of an image is guaranteed overall from the center of a manuscript to the end of the manuscript, the characteristic based upon an angle of view of MTF is often the lowest in the vicinity of 70% from the end as shown in FIG. 6A. In the meantime, as shown in FIG. 6B, lateral chromatic aberration shows a tendency to be deteriorated by the quantity the closer the end of a manuscript is as described above. Therefore, a problem that the displacement of color balance is increased at the end of a manuscript occurs.

Then, in the second embodiment, the curve based upon an angle of view of lateral chromatic aberration shown in FIG. 6A is varied to a shape close to the curve based upon an angle of view showing the deterioration of MTF shown in FIG. 6B by mainly controlling the refractive index and the thickness of the parallel flat plate 10 and dispersion from the plate utilizing the characteristic that the quantity of the parallel displacement of rays by the parallel flat plate 10 is monotonously increased for an angle of view. Hereby, the displacement of color balance can be more satisfactorily corrected.

Third Embodiment

Figure 7:
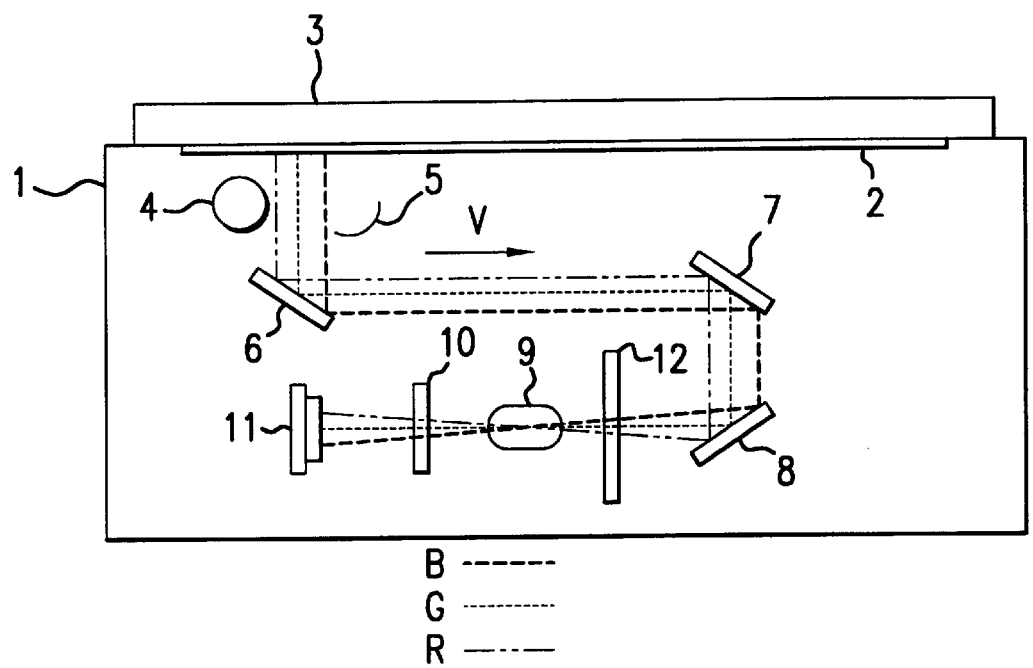
FIG. 7 is a schematic drawing showing the configuration of an image reading apparatus equivalent to a third embodiment of the present invention.

Next, a third embodiment of the present invention will be described. FIG. 7 is a schematic drawing showing the configuration of an image reading apparatus equivalent to the third embodiment of the present invention. The third embodiment is different from the first embodiment in that a xenon lamp is used for a lamp 4, a stopper 12 of sagittal rays is provided in the vicinity of a lens 9 and the design approach of parameters for the lens is divided into two stages.

The xenon lamp has a merit that power consumption is small and conversely, the defect is that a ray outgoing from the lamp does not have much luminous energy. In addition, there are different points such as relative spectral distribution, however, as it cannot be wholesale which is superior, it is not described here and only luminous energy will be considered. Considering the process speed a copying machine, S/N of a line sensor and the resolution of 600 dpi, the F value of the lens 9 cannot be set so that it is larger than 4.0. Lateral chromatic aberration is corrected by a parallel flat plate 10 as in the first embodiment, however, it is MTF that comes into question.

Then, first, the lens 9 is designed so that F is approximately 3.5 and if the loss of luminous energy is suppressed up to approximately 25% by the stopper 12 of sagittal rays in only a horizontal scanning direction, luminous energy equivalent to a case that a lens the F value of which is 4.0 is used for an optical system can be secured. As luminous energy is in inverse proportion to the square of the F value, the initial F value is acquired from the following mathematical expression 1 so that the luminous energy is finally equal to the F value of 4.0.

Mathematical expression 1

$$1/(4.0)^2 = 1/x^2 \times 0.75$$

Therefore, the initial design value of the lens 9 is x=3.464.

Figure 8:
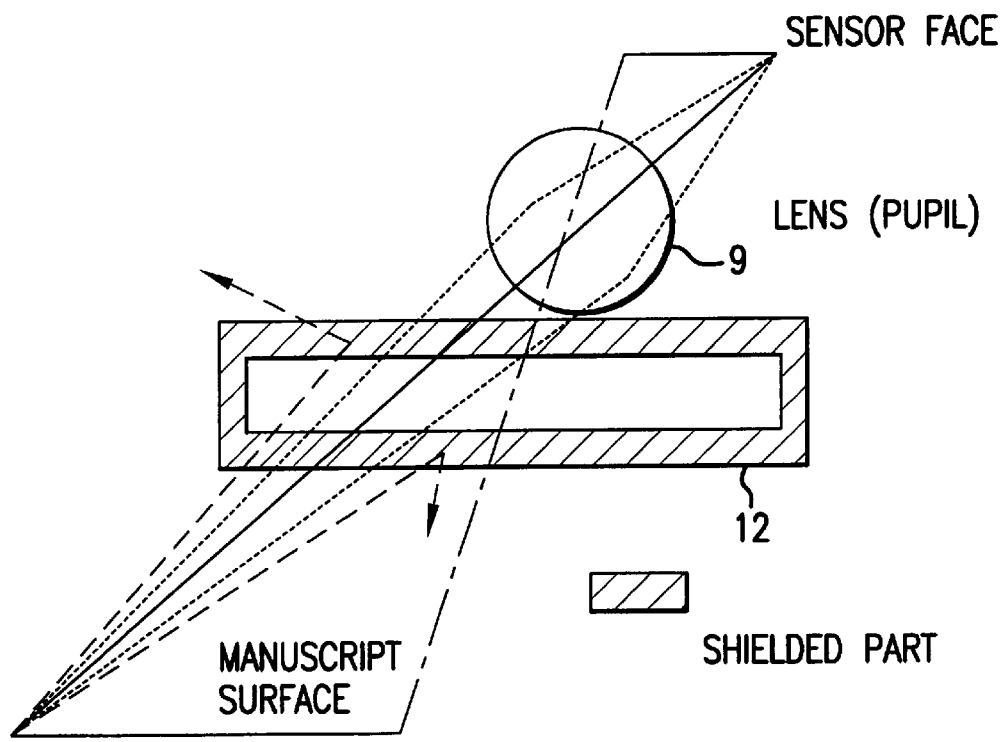
FIG. 8 is a conceptual drawing showing the shape of a stopper of sagittal rays and a state shielded from a lens (a pupil) in the third embodiment.

Next, FIG. 8 is a conceptual drawing showing the shape of the stopper 12 for sagittal rays used this time and a state in which light is shielded from the lens (a pupil). Hereby, as for how luminous energy is decreased, if it is supposed that the distribution of luminous energy in a pupil is flat, the decreased luminous energy is acquired from the ratio of area where light is shielded and the area of the whole pupil. Further, at the lens design stage, considering that the effect by the stopper 12 of sagittal rays has dependence upon an angle of view, a design method is differentiated from a conventional type method. The design method will be described below.

Figure 9A:
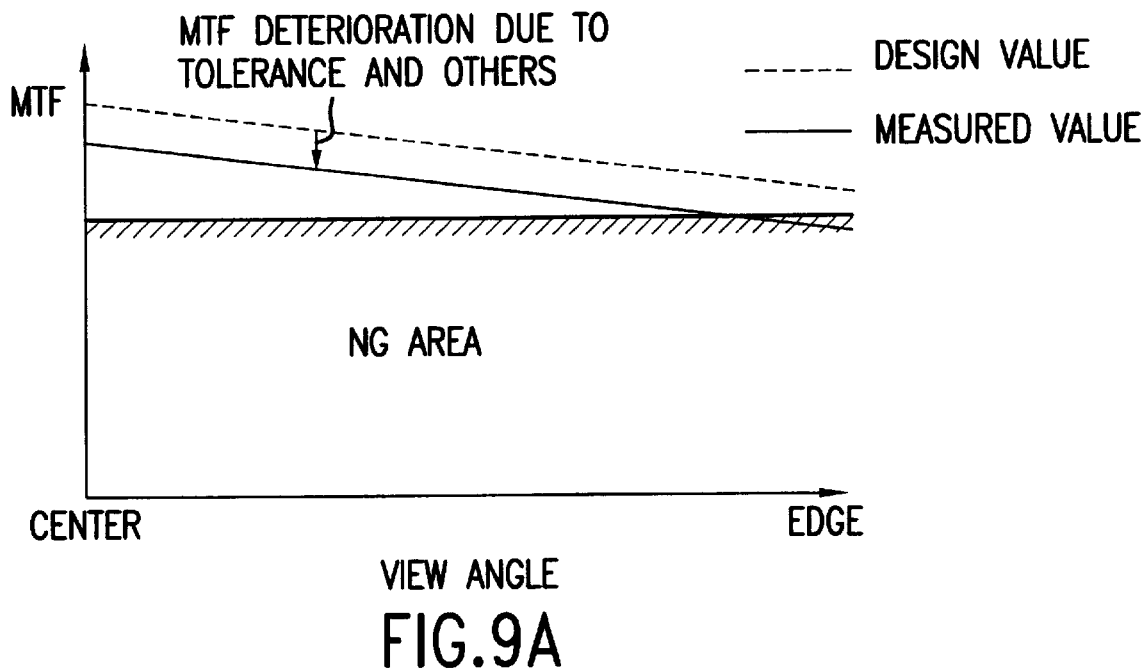
FIGS. 9A and 9B are conceptual drawings for explaining a conventional type design method of a lens.
Figure 9B:
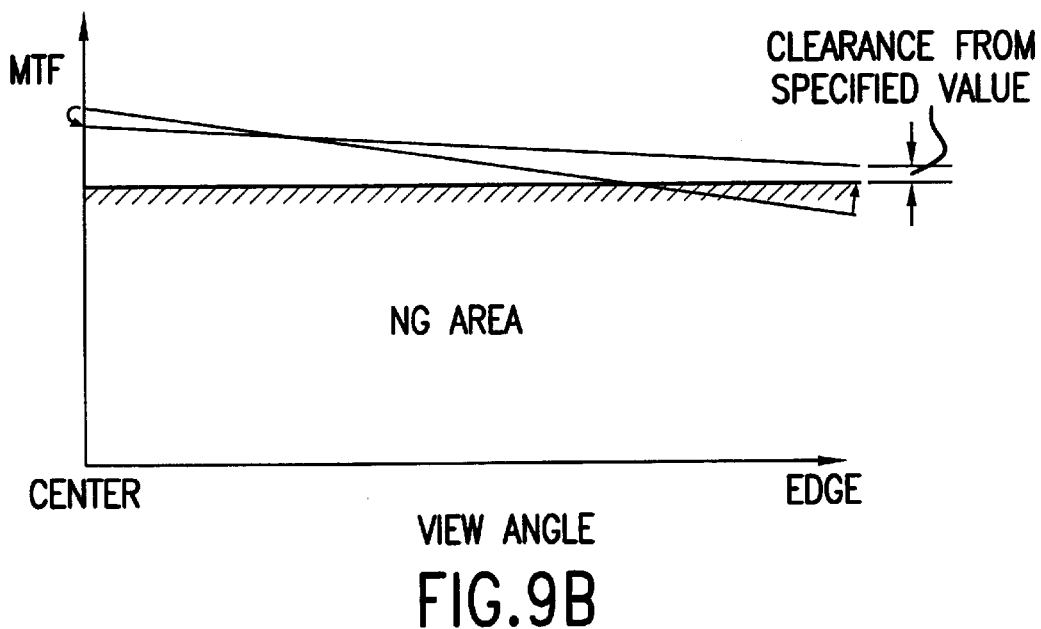
Figure 10A:
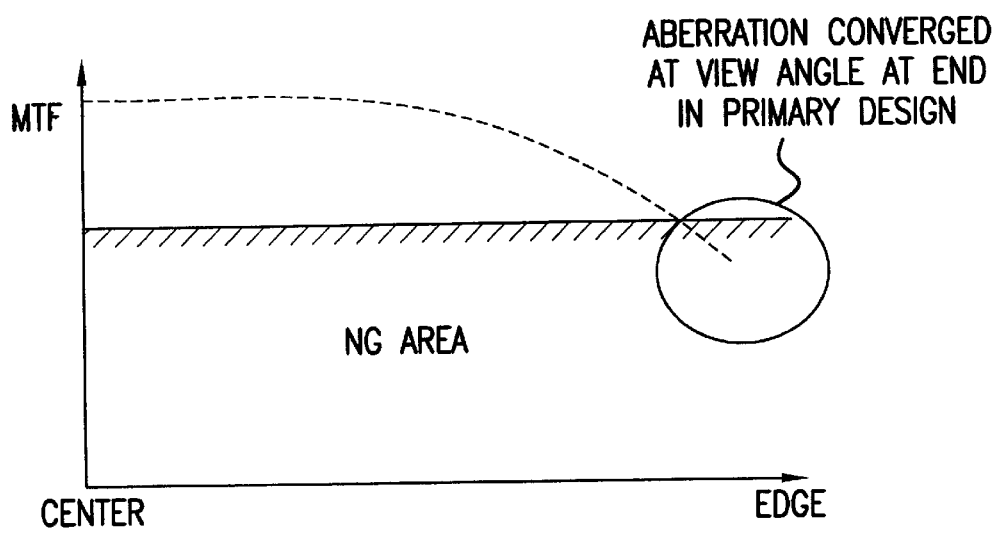
FIGS. 10A and 10B are conceptual drawings for explaining a design method of the lens 9 in the third embodiment.
Figure 10B:
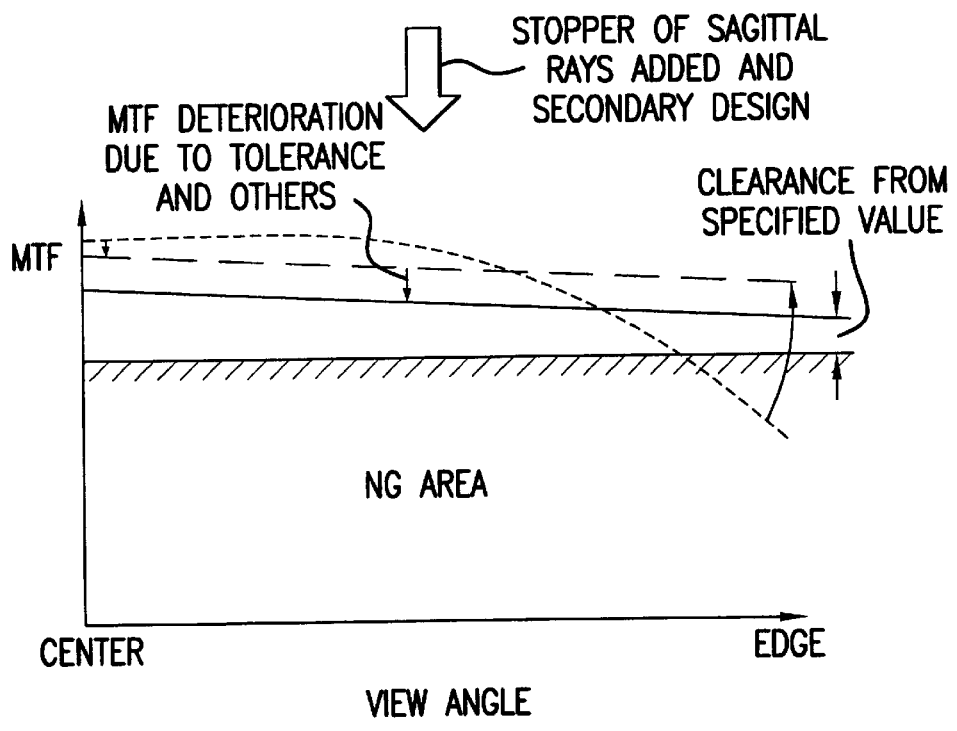

FIGS. 9A and 9B are conceptual drawings for explaining a conventional type design method of a lens and Figs. 10A and 10B are conceptual drawings for explaining the design method of the lens 9 according to the second embodiment. In the conventional type design, a stopper of sagittal rays is a tool attached posteriorly as a measure against MTF trouble and at the design stage of the lens, the effect is not considered. Therefore, the aberration of the lens is dispersed at each angle of view, in a vertical scanning direction and in a horizontal scanning direction and the effect of the above stopper is not derived at the maximum. Concretely, in the conventional type design, as shown in FIG. 9A, as in the case of only the lens 9, MTF for an angle of view is deteriorated because of tolerance and others, MTF in a horizontal scanning direction particularly at the maximum angle of view maybe an allowable value or less. Then, the stopper of sagittal rays is attached posteriorly so that MTF in a horizontal scanning direction at the maximum angle of view is an allowable value or more as shown in FIG. 9B.

In the meantime, in the second embodiment, at a first stage of design divided into two stages, reflected light passes an area in which most of rays which deteriorate aberration are shielded by the stopper 12 of sagittal rays. Concretely, as shown in FIG. 10A, the value of MTF in a horizontal scanning direction in the vicinity of the maximum angle of view is intentionally lowered so that aberration is converged there. In addition, if the stopper 12 of sagittal rays is added and further, balance is kept, very high MTF characteristic can be acquired, compared with that in the conventional type method as shown in FIG. 10B.

Figure 11:
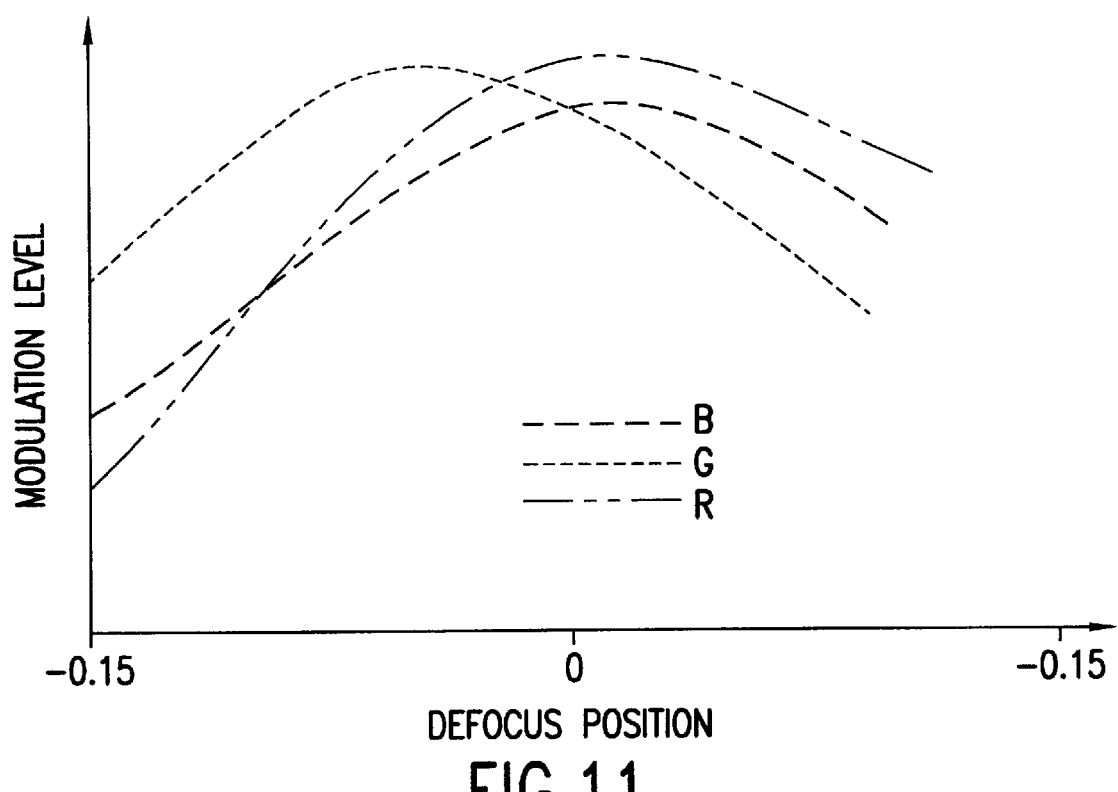
FIG. 11 is a conceptual drawing showing MTF characteristic in designing the lens in the third embodiment.
Figure 12A:
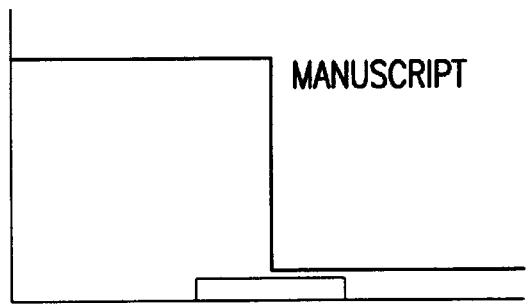
FIGS. 12A to 12C are conceptual drawings for explaining the problems of prior art.
Figure 12B:
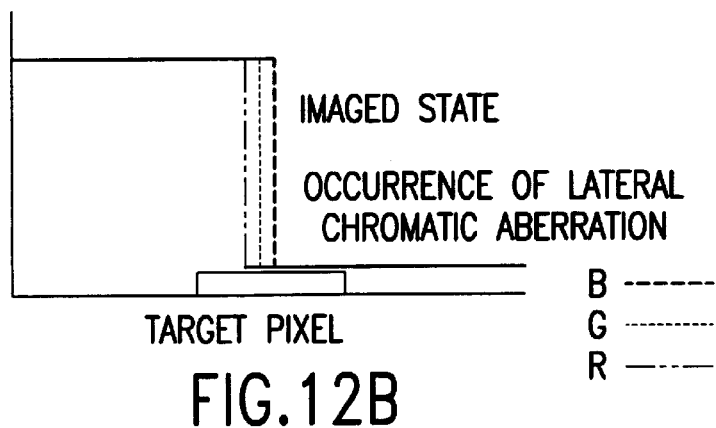
Figure 12C:
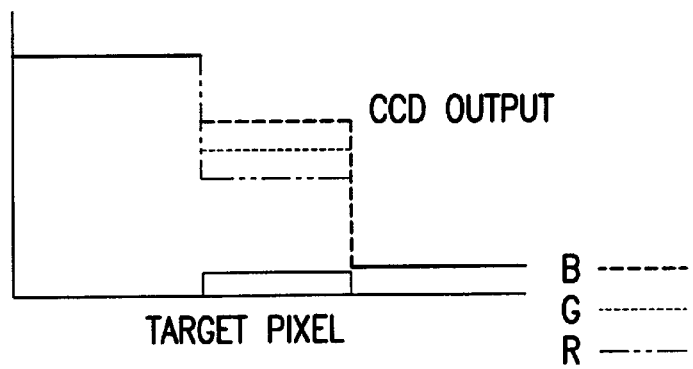

FIG. 11 is a conceptual drawing showing the MTF characteristic of an optical system designed under the above condition. The x-axis shows a defocus position and the y-axis shows an MTF level. It is known that the MTF curves of three colors (B, G, R) are relatively satisfactorily matched at each angle of view. Hereby, it is known that the imaging optical system wherein lateral chromatic aberration is kept within 1 $\mu$m by the parallel flat plate 10 and $\Delta$MTF is also reduced by the stopper 12 of sagittal rays can be designed.

According to the above first and second embodiments, in the image reading apparatus, $\Delta$MTF of 3 to 5 lines/mm corresponding to the frequency of rays corresponding to a character on a manuscript can be suppressed within 10% by securing brightness equivalent to F of 4.0, correcting lateral chromatic aberration by inserting the optical element, suppressing the displacement from a pixel of each color within 10% (0.8 $\mu$m) and in addition, adding the stopper of sagittal rays and setting parameters corresponding to the stopper. Hereby, a black character judgment threshold level (c* in CIEL*a*b* color space) in image processing at the subsequent stage of the CCD sensor 11 can be set to a value equivalent to ⅔ of the prior value, a color reproducible area is widened and no wrong judgment of a black character occurs.

Even if the xenon lamp is used for the reading optical system of a color copying machine, the process speed can be kept at the same level as in a conventional type. Further, the whole imaging optical system can be readily designed by dispersing action for improving aberration among three of the lens, the optical element and the stopper of sagittal rays. Therefore, a manpower required for designing a new optical system can be also reduced.

As described above, according to the present invention, as rays of reflected light imaged by the imaging means are made incident on the photoelectric conversion means after the rays are displaced in parallel by quantity different depending upon each wavelength by the parallel displacement means, advantages that the imaging performance of the optical system can be enhanced at a low cost and picture/character separating processing and the judgment of a black character can be satisfactorily executed are acquired.

What is claimed is:

1. An image reading apparatus comprising:
   irradiation means for irradiating a manuscript;
   imaging means for imaging reflected light from the manuscript irradiated by said irradiation means;
   photoelectric conversion means for converting the reflected light imaged by said imaging means to electric information; and
   parallel displacement means inserted into an optical path between the manuscript and said photoelectric conversion means for displacing rays of the reflected light by a quantity different depending upon each wavelength in parallel so as to reduce a difference in the maximum magnification between wavelengths of the reflected rays so that the difference is smaller than at least a pixel of said photoelectric conversion means.

2. The image reading apparatus according to claim 1, wherein:
   said parallel displacement means reduces the difference in the maximum magnification between wavelengths of the reflected rays up to 20% or less.

3. The image reading apparatus according to claim 1, wherein:
   said parallel displacement means reduces the difference in the maximum magnification between wavelengths of the reflected rays up to 10% or less.

4. The image reading apparatus according to claim 1, wherein:
   said parallel displacement means makes rays with each wavelength of the reflected light outgoing in parallel.

5. The image reading apparatus according to claim 1, wherein:
   said imaging means makes the reflected light outgoing so that rays with a long wavelength are inside and rays with a short wavelength are outside in a vertical scanning direction.

6. The image reading apparatus according to claim 1, wherein:
   said parallel displacement means has a parallel displacement quantity which approximately equalizes a characteristic of lateral chromatic aberration to an angle of view to a characteristic of deterioration of a modulation transfer function to an angle of view.

7. The image reading apparatus according to claim 1, wherein:

said parallel displacement means is a parallel flat plate.

8. The image reading apparatus according to claim 7, wherein:

said parallel flat plate is arranged so that each parallel surface forms a predetermined angle with the optical path of the reflected light;

one of the parallel surfaces is a nonreflective surface; and the other of the parallel surfaces is a total reflection surface.

9. The image reading apparatus according to claim 7, wherein:

said parallel flat plate also functions as an optical filter for absorbing a specific wavelength.

10. The image reading apparatus according to claim 7, wherein:

said parallel flat plate is arranged in an optical path between said imaging means and said photoelectric conversion means.

11. The image reading apparatus according to claim 7, wherein:

said parallel flat plate has a thickness of at least 5 mm or more in the direction of an optical path.

12. The image reading apparatus according to claim 1, further comprising:

light shielding means inserted into the optical path between the manuscript and said photoelectric conversion means for shielding reflected light from the manuscript by a predetermined quantity in a horizontal scanning direction.

13. The image reading apparatus according to claim 12, wherein:

imaging characteristics acquired by the combination of said imaging means and said parallel displacement means are such that a modulation transfer function in the horizontal scanning direction for reflected light from the vicinity of the end of the manuscript is lower by a predetermined quantity than a modulation transfer function in the horizontal scanning direction for reflected light from the vicinity of the center of the manuscript.

14. The image reading apparatus according to claim 12, wherein:

said light shielding means is provided with at least a quantity of shielded light in which a quantity of the rise by shielding reflected light of a modulation transfer function in a horizontal scanning direction is approximately equal to a reduced quantity of a modulation transfer function in the horizontal scanning direction in the imaging characteristics.

15. An image reading method comprising the steps of:

irradiating a manuscript;

imaging reflected light from the irradiated manuscript;

converting the reflected light imaged to electric information; and displacing rays of the reflected light by a quantity different depending upon each wavelength in parallel so as to reduce a difference in a maximum magnification between wavelengths of the reflected rays so that the difference is smaller than at least a pixel in the converting step.

* * * * *